United States Patent
Schlossberg

[11] 3,781,714
[45] Dec. 25, 1973

[54] ISOLATOR FOR HIGH POWER LASER SYSTEM

[75] Inventor: Howard Schlossberg, Lexington, Mass.

[73] Assignee: The United States of America as represented by the Secretary of the Air Force, Washington, D.C.

[22] Filed: Feb. 5, 1973

[21] Appl. No.: 329,510

Related U.S. Application Data

[62] Division of Ser. No. 155,567, June 22, 1971, abandoned.

[52] U.S. Cl. .............................................. 331/94.5
[51] Int. Cl. ............................................. H01s 3/02
[58] Field of Search .................................. 331/94.5

[56] References Cited
UNITED STATES PATENTS

| | | | |
|---|---|---|---|
| 3,456,210 | 7/1969 | Statz et al. | 331/94.5 |
| 3,523,718 | 8/1970 | Crow | 331/94.5 |
| 3,646,469 | 2/1972 | Buczek et al. | 331/94.5 |
| 3,691,477 | 9/1972 | Janney | 331/94.5 |

OTHER PUBLICATIONS

Young et al., Traveling-Wave Ruby Laser With a Passive Optical Isolator, J. Appl. Phys., Vol. 36, No. 10, pg. 3351.

*Primary Examiner*—William L. Sikes
*Attorney*—Harry A. Herbert, Jr. et al.

[57] ABSTRACT

A high power laser system having a radiation source and an amplifier with an isolator located in such a position as to reflect radiation from said source to said amplifier. This isolator is made up of an isolator element in intimate contact with a reflector-heat sink and surrounded by a magnetic field. The arrangement of the isolator enables the radiation emanating from the source to be twice passed through the isolator element while affording maximum cooling of the element during operation of the system.

5 Claims, 3 Drawing Figures

INVENTOR.
HOWARD SCHLOSSBERG
BY Harry A. Herbert Jr
Jacob N. Erlich and
ATTORNEYS

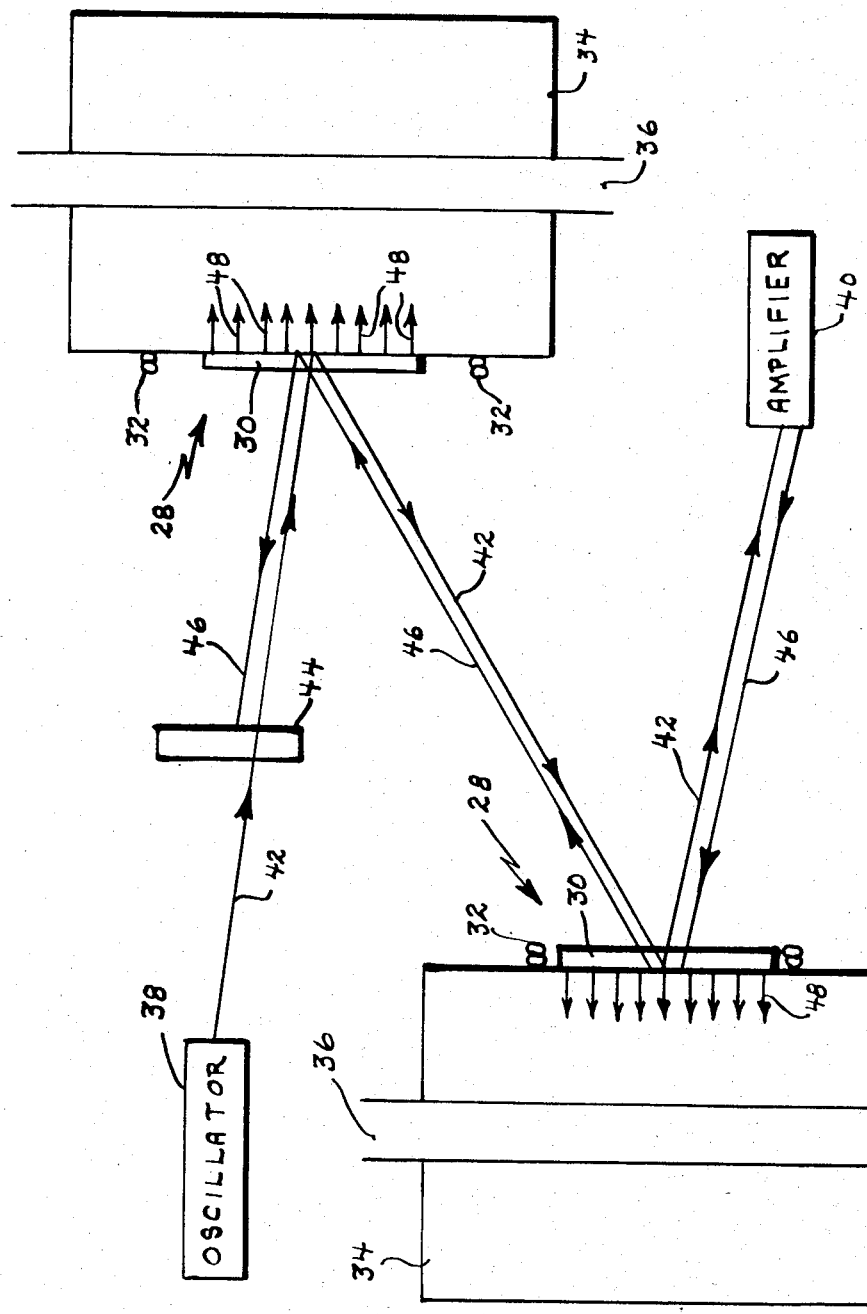

ISOLATOR FOR HIGH POWER LASER SYSTEM

BACKGROUND OF THE INVENTION

This invention relates generally to lasers, and more particularly to an improvement in the isolator element utilized in high power lasers.

The development of the laser has created a new area of technology which finds application in many systems already in existence today. For example, lasers can be found in the area of optical communications, holography, medicine, cutting, calculating and in radar.

The utilization of the laser in such areas is in many instances dependent upon the amplification of the existing laser radiation. In order to accomplish such an increase in laser power it is necessary for an isolator to be situated between the laser or oscillator producing the radiation and the amplifier.

Lasers of the past utilized an isolator made up of an isolator element within a strong magnetic field adjacent a polarizer set at 45°. These isolators permitted the transmission of the laser beam in one direction and in so doing rotated the polarization of the beam, thereby allowing the polarizer to block its transmission in the return direction. In order to prevent destruction of the isolator by the reflected amplified radiation or by the radiation from the oscillator, in the past these isolators were cooled at their edges by any conventional cooling system.

In certain areas, such as in optical communication or optical radar, it is necessary to greatly amplify the initial radiation power produced by the laser. Heretofore, such an amplification proved to be highly impractical since the existing isolators for high power lasers were cooled at their edges. Because the heat deposited by the radiation in isolators of the past was carried to the edge of the element, the radiation power and aperture of the element were limited by the allowable temperature rise in the element center or by stress due to thermal gradients. Therefore any increased radiation returned by the amplifier was of such strength as to destroy the isolator element and further, damage the oscillator or laser from which such power emanated.

In areas of use, wherein a large power output laser is required, the expense involved in the past made the cost of the project or system prohibitive. Heretofore, no isolator has been economically developed which could accommodate the large heat transfer involved in amplification of laser power.

SUMMARY OF THE INVENTION

This invention overcomes the problems set forth hereinabove by providing a Faraday rotation isolator for high power lasers which is mounted on a cooled copper mirror. The utilization of the cooled copper mirror acts as a reflecting agent and as a direct heat sink for the entire isolator element. The isolator of this invention removes heat through the thin dimension of the element and thereby allows for a higher power operation than previously possible. Further, the allowable aperture of the isolator is unlimited with the stress small, uniform and compressional so that material damage due to them is unlikely. It is further possible to liquid nitrogen cool the reflector element if desired to provide a larger heat dissipation.

It is preferable to use an Indium antimonide crystal as the isolator element located within a magnetic field and being in intimate contact with a well polished copper mirror acting as the reflector and heat sink. This crystal may be held to the copper mirror with a thermally conducting paste applied near its edges or with spring clips attached to the copper. In the instant invention the radiation emanating from the oscillator or laser is allowed to make two passes through the Indium antimonide crystal at a very small angle to its axis and is reflected by the copper mirror to an amplifier. Any reflected radiation from the amplifier in the direction of the oscillator will be blocked by a polarizer situated in front of the oscillator.

Because of the reflecting surface and heat sink of the copper mirror adjacent the crystal, any heating of the crystal which takes place due to the increase in power will be conducted in a uniform manner through the thin dimension of the crystal. Since the temperature and stress distribution are uniform, the distortion of the input radiation beam is far lower than for the edge cooled isolator of the past. This principle can be readily extended to more than one reflection and amplification if necessary, something almost totally impossible with the isolators of the past.

It is therefore an object of this invention to provide an isolator capable of handling large amounts of laser radiation passing therethrough.

It is another object of this invention to provide an isolator which uniformly conducts heat along the thin dimension of the isolator element.

It is a further object of this invention to provide an isolator in which the incident radiation from a source passes twice through the isolator element before reaching the amplifier.

It is still another object of this invention to provide an isolator which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

FIG. 3 is a schematic drawing of a plurality of isolators of this invention used in combination with an oscillator and amplifier.

DETAILED DESCRIPTION OF THE PREFERRED EMBODIMENT

Figure 1:
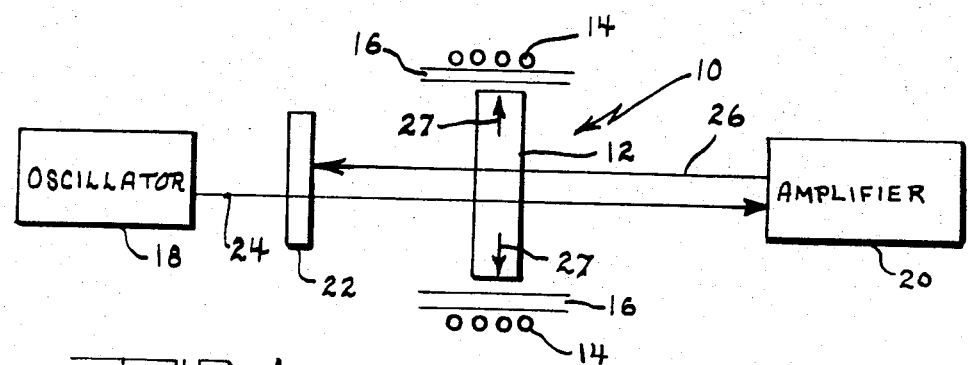
FIG. 1 is a schematic drawing of the prior art isolator used in combination with an oscillator and amplifier.

Reference is now made to FIG. 1 of the drawing which shows in schematic fashion the isolator 10 of the prior art. This isolator is in the form of an isolator element 12 located within a strong magnetic field 14. Any conventional cooling system 16 is utilized to dissipate the heat within the element 12. The isolator 10 is positioned between the laser or oscillator 18 and amplifier 20 with a polarizer 22 adjacent oscillator 18. In operation the radiation or laser beam 24 emanating from oscillator 18 passes through polarizer 22 and isolator 10 before entering the amplifier 20. The isolator 10, because of the strong magnetic field associated therewith, "rotates" beam 24 during passage therethrough. Because of this beam rotation in a continuous direction upon passing through a magnetic field (Faraday Effect) any return or reflected amplified radiation 26 from amplifier 20 will be blocked by polarizer 22 from reaching oscillator 18.

As can be seen from FIG. 1, the heat 27 generated by the amplified radiation 26 passing through isolator element 12 is carried to the edges of element 12 where it is cooled by system 16. Such a cooling system 16, however, it totally deficient when it is necessary to cool the large amounts of heat produced by greatly amplified radiation. The excess heat within the isolator element 12 not only destroys the element itself but thereafter also allows the return radiation to damage oscillator 18. It can be clearly seen that the isolator system 10 of the past lacked the proper cooling capacity necessary to handle the large amounts of radiation power of laser communication and radar systems.

Figure 2:
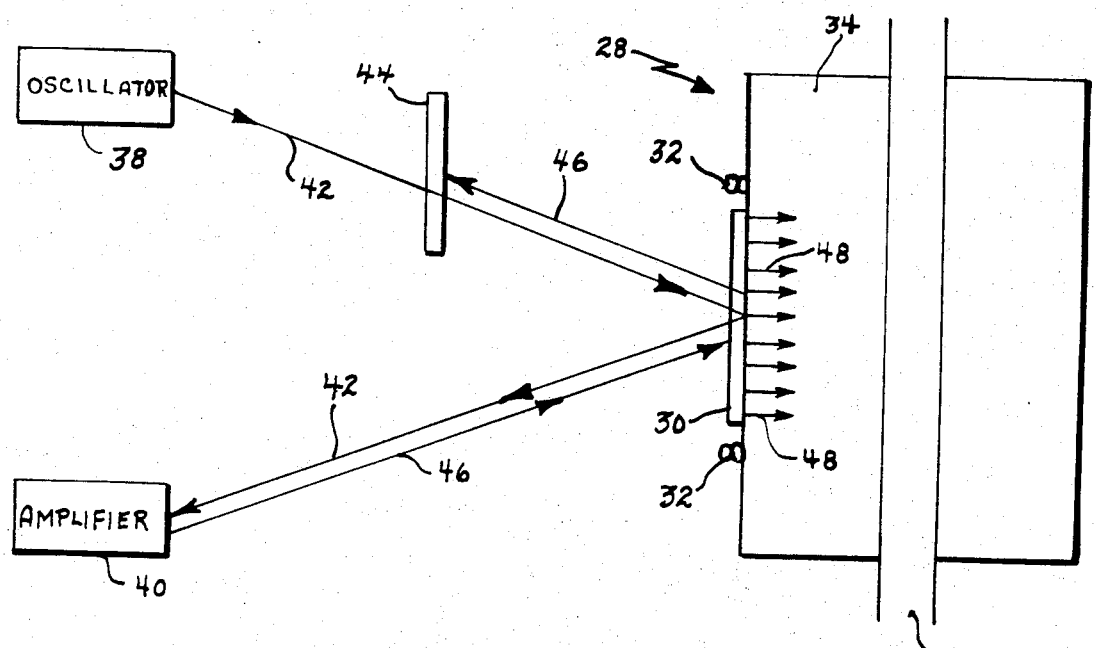
FIG. 2 is a schematic drawing of the isolator of this invention used in combination with an oscillator and amplifier.

The instant invention is best shown in FIG. 2 of the drawing. In the isolator 28 of this invention the isolator element 30 is made of any suitable material such as an indium antimonide crystal 0.5 mm thick (e.g. 1 cm in diameter) with $2\times10^{17}$ carrier electrons/cm$^3$ placed within a magnetic field 32 of approximately 2500 gauss. The surfaces of the isolator element 30 are optically polished and the element 30 is placed in intimate contact with a well polished reflector-heat sink 34 preferably of copper. This reflector-heat sink 34 is cooled by any suitable substance 36 such as water or liquid nitrogen. The isolator element 30 is held in place on copper reflector-heat sink 34 with any thermally conducting paste applied near its surface or with spring clips (not shown) attached to the reflector-heat sink 34. If necessary for intimate contact a thin gold layer may be deposited on the isolator surface.

With the isolator 28 of the instant invention the laser source or oscillator 38 and the amplifier 40 are placed on the same side of the isolator 28. Because of this relationship the incident radiation or beam 42 makes two passes through the isolator element 30 at a very small angle, having been reflected by the copper reflector-heat sink 34. By making two passes through the isolator element 30 the corresponding magnetic field 32 necessary for beam rotation may be reduced by a factor of two. (It is also possible that the magnetic field remain constant e.g. 500 gauss and the isolator element 30 be of half the thickness used.)

As with the isolator 10 of the prior art a polarizer 44 is located adjacent the oscillator 38 to prevent any reflected radiation 46 from amplifier 40 from reaching oscillator 38.

The isolator 28 in combination with the oscillator 38 and amplifier 40 as set forth in FIG. 2 greatly increases the laser power handling capacity over systems of the past which are cooled at the edge of the isolator element since, due to the high diameter to thickness ratio heat will be uniformly conducted through the 0.5 mm thickness (thin dimension) into the copper reflector-heat sink 34 as shown by arrows 48. Because of the arrangement of this invention the aperture of the isolator element is unlimited in size and thermal stress is uniform and along the thin dimension. Since the temperature and stress distributions are uniform, the distortion of the input radiation beam is far lower than for the edge cooled isolators 10 of the prior art. It is possible to handle radiation flux in excess of 1 kilowatt/cm$^2$ with the instant invention.

Still referring to FIG. 2, in operation the radiation beam 42 emanating from oscillator 38; (1) passes through polarizer 44; (2) passes through isolator element 30 where it is "rotated;" (3) reflects of copper mirror 34; (4) passes back through isolator element 30 where it is still further "rotated;" and (5) passes onto amplifier 40 where it is amplified for further use. Any reflected radiation 46 from amplifier 40 returns through isolator element 30 where the heat accumulated therein conducts through the thin dimension of the isolator element 30 to copper heat sink 34. The reflected radiation 46 is blocked by polarizer 44.

Not only does this invention allow for great amplification of radiation power without damage to the isolator 30 and oscillator 38, but this invention also allows for a reduction of the magnetic field 32 necessary to rotate the radiation beam due to the double pass of incident radiation through the isolator element 30.

Reference is now made to FIG. 3 of the drawing wherein like numerals will designate identical elements of FIG. 2. As shown in FIG. 3, the isolator system of this invention can be readily extended to more than one reflection if necessary, a process heretofore virtually impossible. With the use of two or more isolators 28, the incident radiation power emenating from oscillator 38 can be even more greatly increased. For given magnetic fields this procedure allows the isolator elements 30 to be of one-fourth the thickness otherwise necessary, thereby further reducing the heat load on each isolator element 30 for a given heat flux.

Although this invention has been described with reference to a particular embodiment, it will be understood to those skilled in the art that the isolator of this invention could also be used as part of a circulator at the output of a radar (in order to use the same telescope for transmitting as well as receiving) or between a preamplifier and an amplifier all within the spirit and scope of the appended claims.

I claim:

1. A high power laser system comprising a laser source for producing a high power laser beam, an isolator located adjacent said laser source in optical alignment with said laser beam, said isolator comprising a reflector-heat sink, an element which exhibits a Faraday Effect fixedly secured to said reflector-heat sink, and means surrounding said element for causing said element to produce a beam rotation therein, a polarizer located between said laser source and said isolator and an amplifier located on the same side of said isolator as said laser source whereby said laser beam passes through said polarizer and through said element wherein it is rotated, reflects off said reflector-heat sink, passes back through said element wherein it is still further rotated and passes onto said amplifier, any reflected laser beam from said amplifier being further rotated by said isolator before passing onto said polarizer where it is prevented from reaching said laser source.

2. A high power laser system as defined in claim 1 wherein said isolator element is held in contact with said reflector-heat sink by a thermally conducting paste.

3. A high power laser system as defined in claim 2 wherein said reflector-heat sink is made of copper.

4. A high power laser system as defined in claim 1 wherein a second isolator is located adjacent said first isolator thereby receiving said reflected laser beam therefrom, said second isolator reflecting said laser beam to said amplifier.

5. A high power laser system as defined in claim 4 wherein said second isolator comprises a reflector-heat sink, an element which exhibits a Faraday Effect fixedly secured thereto and means surrounding said element for causing said element to produce a beam rotation therein.

* * * * *